(12) United States Patent
Thubert et al.

(10) Patent No.: US 10,491,515 B2
(45) Date of Patent: Nov. 26, 2019

(54) FAST AND LOSS-FREE LOCAL RECOVERY BY A RPL PARENT DEVICE

(71) Applicant: Cisco Technology, Inc., San Jose, CA (US)

(72) Inventors: Pascal Thubert, La Colle sur Loup (FR); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/922,177

(22) Filed: Mar. 15, 2018

(65) Prior Publication Data

US 2019/0081892 A1    Mar. 14, 2019

Related U.S. Application Data

(60) Provisional application No. 62/558,083, filed on Sep. 13, 2017.

(51) Int. Cl.
| | |
|---|---|
| *H04L 12/705* | (2013.01) |
| *H04L 12/753* | (2013.01) |
| *H04L 12/751* | (2013.01) |
| *H04L 12/24* | (2006.01) |
| *H04L 12/721* | (2013.01) |

(52) U.S. Cl.
CPC ............ *H04L 45/48* (2013.01); *H04L 41/12* (2013.01); *H04L 45/02* (2013.01); *H04L 45/18* (2013.01); *H04L 45/34* (2013.01)

(58) Field of Classification Search
CPC ......... H04L 45/48; H04L 41/12; H04L 45/02; H04L 45/18; H04L 1/12; H04L 45/34
See application file for complete search history.

(56) References Cited

U.S. PATENT DOCUMENTS

| 7,209,978 B2 | 4/2007 | Thubert et al. |
| 7,366,111 B2 | 4/2008 | Thubert et al. |
| 8,102,775 B2 | 1/2012 | Thubert |
| (Continued) | | |

OTHER PUBLICATIONS

Przygienda, Ed., et al. "RIFT: Routing in Fat Trees", [online] RIFT Working Group, Internet Draft, Mar. 1, 2018 [retrieved on Mar. 5, 2018]. Retrieved from the Internet: URL: <https://tools.ietf.org/pdf/draft-przygienda-rift-05.pdf>, pp. 1-67.

(Continued)

*Primary Examiner* — Mansour Oveissi
*Assistant Examiner* — David M Oveissi
(74) *Attorney, Agent, or Firm* — Leon R. Turkevich

(57) ABSTRACT

In one embodiment, a network device (e.g., a RPL router) executes fast local RPL recovery in a low power and lossy network (LLN). The network device, in response to becoming an orphan in a directed acyclic graph (DAG) topology, can utilize the data plane to maintain at least some data traffic by randomly forwarding the data traffic to identified neighbor devices, while eliminating children from the list of forwarders and by finding successors that can be used for re-parenting. Hence, when a RPL network device having lost its last feasible parent can avoid data loss and accelerate a re-parenting process using local repair in the data plane instead of the control plane of the routing protocol used to establish the DAG topology.

12 Claims, 14 Drawing Sheets

(56) References Cited

U.S. PATENT DOCUMENTS

| | | | |
|---|---|---|---|
| 2014/0126610 A1 | 5/2014 | Hui et al. | |
| 2014/0330832 A1* | 11/2014 | Viau | G06Q 10/101 |
| | | | 707/740 |
| 2016/0066249 A1* | 3/2016 | Dukes | H04W 40/246 |
| | | | 370/255 |
| 2016/0150501 A1 | 5/2016 | Hui et al. | |
| 2016/0182306 A1 | 6/2016 | Liu | |
| 2017/0034772 A1* | 2/2017 | Purohit | H04W 48/16 |
| 2017/0188409 A1 | 6/2017 | Lee et al. | |
| 2017/0353292 A1 | 12/2017 | Thubert et al. | |

OTHER PUBLICATIONS

Barthel, "Simplified neighbour cache implementation in RPL/6LoWPAN", [online], Feb. 9, 2011 [retrieved on Jan. 5, 2018]. Retrieved from the Internet: URL: <https://www.iab.org/wp-content/IAB-uploads/2011/03/Barthel.pdf>, pp. 1-2.

Bartolozzi et al., "Supporting Monitoring Applications with Mobile Wireless Sensor Networks: the eN Route Forwarding Approach", IEEE ICC 2012—Wireless Networks Symposium, [online] [retrieved on Jan. 5, 2018]. Retrieved from the Internet: URL: <http://ieeexplore.ieee.org/document/6363726/>, pp. 5403-5407.

Watteyne, "Reliable Local Repair in RPL", [online] Sep. 7, 2017 [retrieved on Dec. 27, 2017]. Retrieved tom the Internet: URL: <https://bitbucket.org/6tisch/meetings/raw/7c31d4efde450a703de3b277018b4440fe8d5da4/170908_webex/Reliable_RPL_v1.pptx>, 11 pages.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Vasseur, Ed., et al., "Routing Metrics Used for Path Calculation in Low-Power and Lossy Networks", Internet Engineering Task Force (IETF), Request for Comments: 6551, Mar. 2012, pp. 1-30.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Hui et al., "The Routing Protocol for Low-Power and Lossy Networks (RPL) Option for Carrying RPL Information in Data-Plane Datagrams", Internet Engineering Task Force (IETF), Request for Comments: 6553, Mar. 2012, pp. 1-9.

Gnawali et al., "The Minimum Rank with Hysteresis Objective Function", Internet Engineering Task Force (IETF), Request for Comments: 6719, Sep. 2012, pp. 1-13.

Shelby, Ed., et al., Neighbor Discovery Optimization for IPv6 over Low-Power Wireless Personal Area Networks (6LoWPANs), Internet Engineering Task Force (IETF), Request for Comments: 6775, Nov. 2012, pp. 1-55.

* cited by examiner

FAST AND LOSS-FREE LOCAL RECOVERY BY A RPL PARENT DEVICE

This application claims priority to Provisional Application No. 62/558,083, filed Sep. 13, 2017.

TECHNICAL FIELD

The present disclosure generally relates to computer networks, and more particularly, to fast and loss-free local recovery by a RPL parent network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
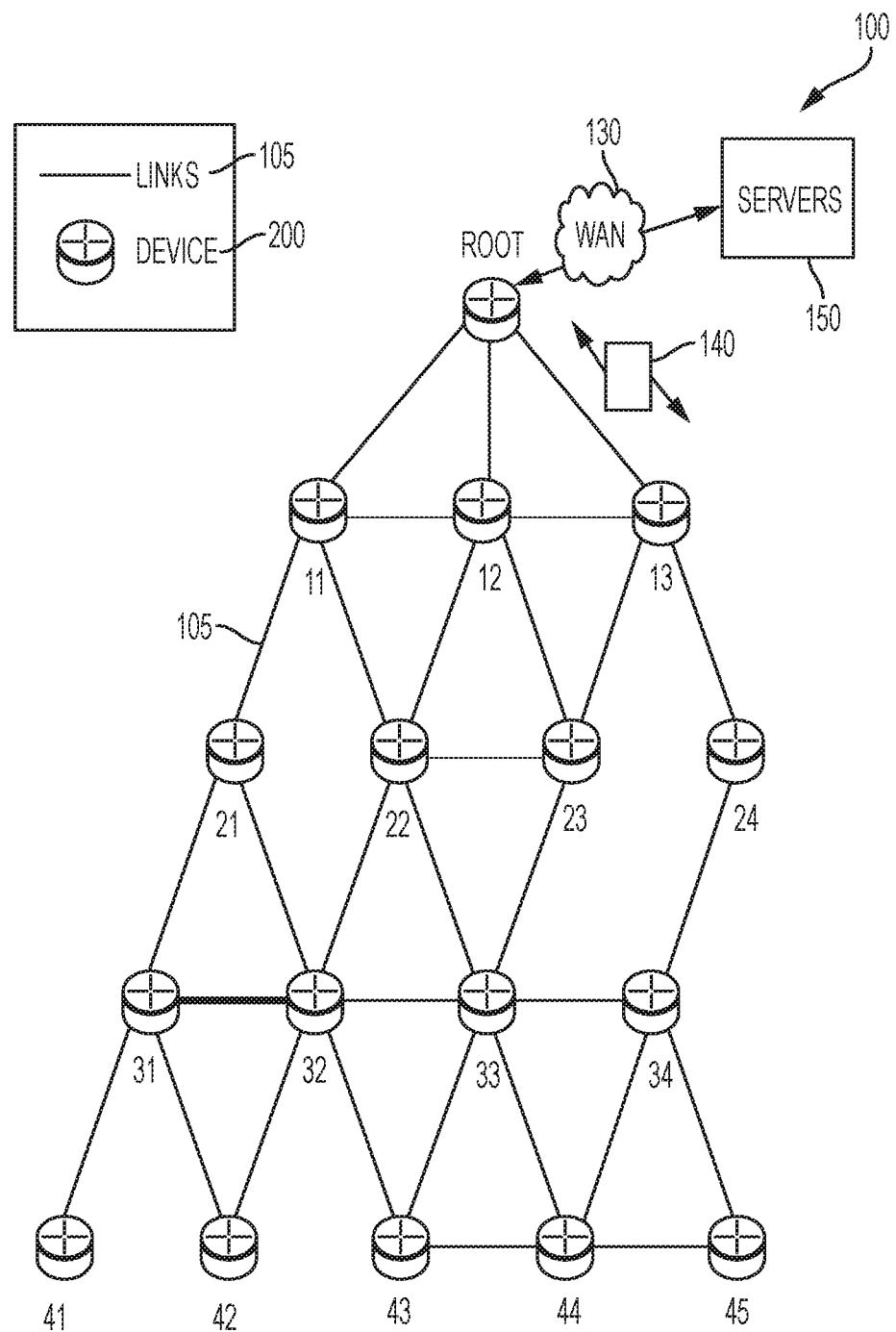
FIG. 1 illustrates an example communication network according to an example embodiment.

In one embodiment, a method comprises detecting, by a network device having established a connection with a parent network device in a directed acyclic graph (DAG) topology established according to a prescribed routing protocol in a communication network, that the network device has become an orphan based on detecting a loss of the connection with the parent network device; receiving, by the network device, a data packet from a child network device having attached to the network device according to the prescribed routing protocol; and forwarding, by the network device, a flagged copy of the data packet to one or more randomly-selected neighboring network devices, for attempted forwarding into the DAG topology, including setting in the flagged copy a loop detection flag that enables the network device to detect whether the flagged copy is returned to the network device.

In another embodiment, one or more non-transitory tangible media are encoded with logic for execution by a machine and when executed by the machine operable for: detecting, by the machine implemented as a network device having established a connection with a parent network device in a directed acyclic graph (DAG) topology established according to a prescribed routing protocol in a communication network, that the network device has become an orphan based on detecting a loss of the connection with the parent network device; receiving, by the network device, a data packet from a child network device having attached to the network device according to the prescribed routing protocol; and forwarding, by the network device, a flagged copy of the data packet to one or more randomly-selected neighboring network devices, for attempted forwarding into the DAG topology, including setting in the flagged copy a loop detection flag that enables the network device to detect whether the flagged copy is returned to the network device.

In another embodiment, a method comprises: detecting, by a network device having established a connection with a parent network device in a directed acyclic graph (DAG) topology established according to a prescribed routing protocol in a communication network, that the network device has become an orphan based on detecting a loss of the connection with the parent network device; outputting, by the network device, a message for a root of the DAG topology based on identifying a neighboring network device, including inserting into the message a request for the root to send a response via the identified neighboring network device, and sending the message to the neighboring network device; and selectively executing fast parent selection based on identifying the neighboring network device as a feasible successor parent device in response to receiving the response from the root via the neighboring network device, distinct from the prescribed routing protocol that established the DAG topology.

In another embodiment, one or more non-transitory tangible media are encoded with logic for execution by a machine and when executed by the machine operable for: detecting, by the machine implemented as a network device having established a connection with a parent network device in a directed acyclic graph (DAG) topology established according to a prescribed routing protocol in a communication network, that the network device has become an orphan based on detecting a loss of the connection with the parent network device; outputting, by the network device, a message for a root of the DAG topology based on identifying a neighboring network device, including inserting into the message a request for the root to send a response via the identified neighboring network device, and sending the message to the neighboring network device; and selectively executing fast parent selection based on identifying the neighboring network device as a feasible successor parent device in response to receiving the response from the root via the neighboring network device, distinct from the prescribed routing protocol that established the DAG topology.

DETAILED DESCRIPTION

Particular embodiments enable an orphaned RPL network device (e.g., RPL router) that has lost its connection to its parent network device to execute fast local (data plane) recovery in a low power and lossy network (LLN). The orphaned RPL network device can maintain forwarding of data traffic in a data plane without loss of data packets, even if the RPL network device becomes an orphan disconnected from a DAG, based on the RPL network device inserting a loop detection flag into a data packet received from a child device in its subDAG, and forwarding the flagged copy of the data packet to a detected neighboring network device for attempted forwarding into the DAG: the loop detection flag in the flagged copy of the data packet enables the orphaned RPL network device to detect whether the neighboring network device is a child that causes a loop within the subDAG.

The orphaned RPL network device also can execute fast local recovery based on executing fast parent selection independent and distinct from any existing RPL routing protocol. The orphaned RPL network device can execute the fast parent selection based on identifying a neighboring network device as a feasible successor parent: the orphaned RPL network device can output a message for a RPL root via a detected neighboring network device, and identify the neighboring network device as a feasible successor parent in response to receiving a response from the RPL root via the neighboring network device. The fast parent selection also can be executed proactively, i.e., independent from receiving any data packet from a child network device in its subDAG.

Hence, the orphaned RPL network device can execute fast local recovery in a data plane based on forwarding flagged copies of received data packets to neighboring network devices for attempted forwarding into the DAG, and/or executing fast parent selection in response to receiving a response from the DAG root via a neighboring network device: the orphaned RPL network device can eliminate any children (i.e., child network devices attached to the RPL network device) from its list of potential successor devices in the RPL network in response to receiving a flagged copy; the orphaned RPL network device also can execute fast local recovery of data plane communications between the orphaned RPL network device and the RPL root based on identifying successor devices (i.e., successor parent devices) in the RPL network that can be used for fast parent selection, re-parenting, etc., for fast recovery. In this way, even if a RPL node loses its last feasible parent, data loss can be avoided and the re-parenting process can be accelerated (i.e., sped up) in a situation of local repair that is separate and distinct from any RPL routing protocol executed in the RPL network.

An overview description will first be provided of example technology used to implement the example embodiments, followed by a detailed description of the fast and loss-free local recovery by a RPL parent network device.

Overview

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network (i.e., data network) 100 illustratively comprising network nodes (i.e., network devices) 200 (e.g., labeled as shown, "root," "11," "12," ... "45," and described in FIG. 2 below) interconnected by various methods of communication. For instance, the data links 105 may be wired links or shared media (e.g., wireless links, PLC links, etc.) where certain network nodes 200, such as, e.g., routers, sensors, computers, etc., may be in communication with other network nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
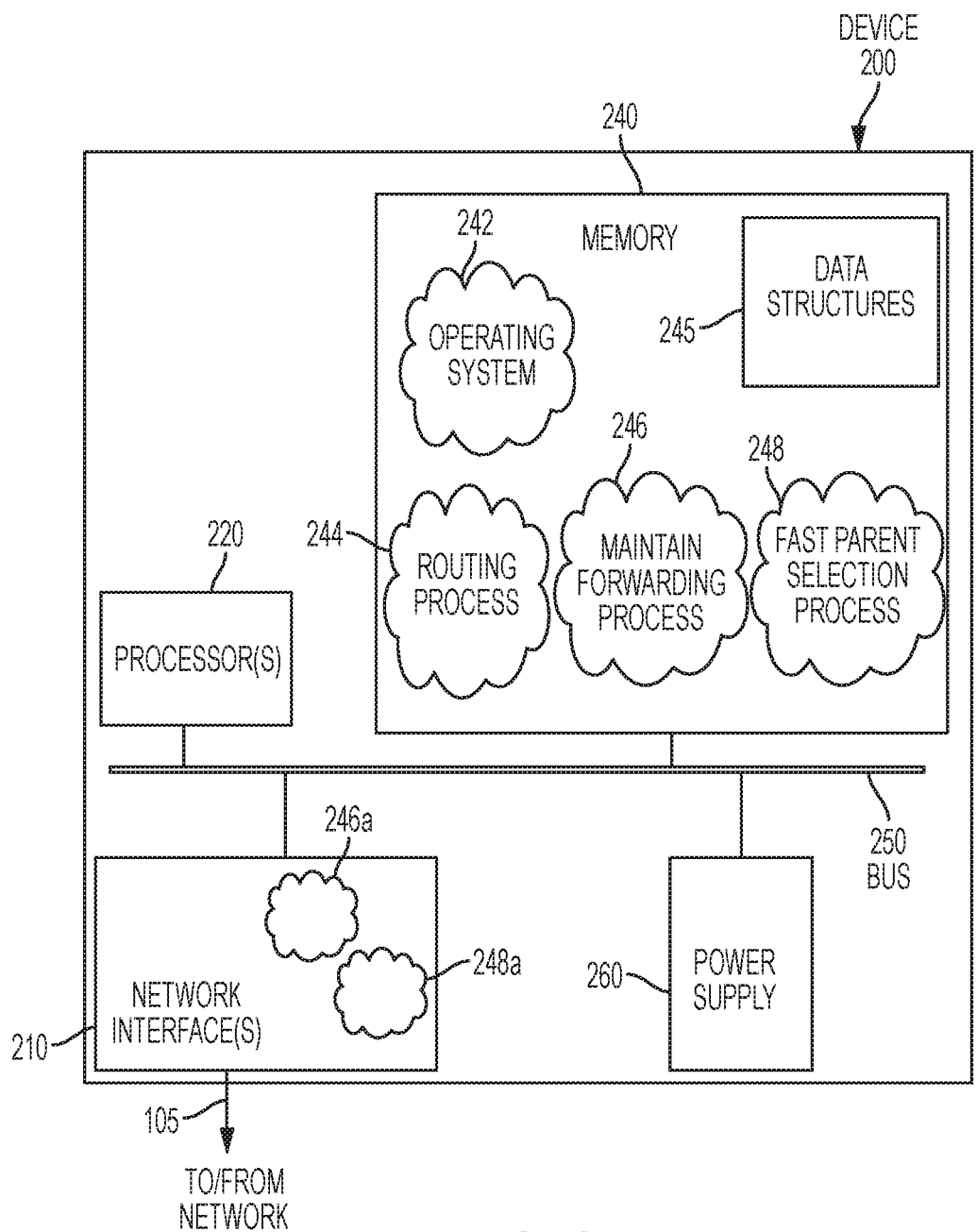
FIG. 2 illustrates an example network device/node according to an example embodiment.

FIG. 2 is a schematic block diagram of an example node/device 200 that may be used with one or more embodiments described herein, e.g., as any of the nodes shown in FIG. 1 above or any of the Figures. The device may comprise one or more network interface circuits (i.e., device interface circuits) 210 (e.g., wired, wireless, PLC, etc.), at least one processor circuit 220, and a memory circuit 240 interconnected by a system bus 250, as well as a power supply 260 (e.g., battery, plug-in, etc.).

The network interface circuit(s) 210 can contain the mechanical, electrical, and signaling circuitry for communicating data over data links 105 coupled to the data network 100. The network interface circuits 210 may be configured to transmit and/or receive data using a variety of different communication protocols. Note, further, that the nodes may have two different types of network links or connections 105, e.g., wireless and wired/physical connections, and that the view herein is merely for illustration. Also, while the network interface 210 is shown separately from power supply 260, for PLC the network interface circuit 210 may communicate through the power supply 260, or may be an integral component of the power supply. In some specific configurations the PLC signal may be coupled to the power line feeding into the power supply.

The memory circuit 240 comprises a plurality of storage locations that are addressable by the processor circuit 220 and the network interface circuits 210 for storing software programs and data structures associated with the embodiments described herein. Note that certain devices may have limited memory or no memory (e.g., no memory for storage other than for programs/processes operating on the device and associated caches). The processor circuit 220 may comprise hardware elements or hardware logic adapted to execute the software programs and manipulate the data structures 245. An operating system 242, portions of which are typically resident in memory circuit 240 and executed by the processor, can functionally organize the device by, inter alia, invoking operations in support of software processes and/or services executing on the device 200. These software processes and/or services may comprise routing process/services 244, an illustrative maintain forwarding process 246, and an illustrative fast parent selection process 248, as described herein. Note that while maintain forwarding process 246 and fast parent selection process 248 are shown in centralized memory circuit 240, alternative embodiments provide for the processes to be specifically operated within the network interface circuits 210, such as a component of a MAC layer (process "246a" and "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor circuit 220 to perform functions provided by one or more routing protocols, such as proactive (e.g., RPL) or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. For example, a field area router (FAR) may operate as a root node for any number of other LLN devices. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

Figure 3:
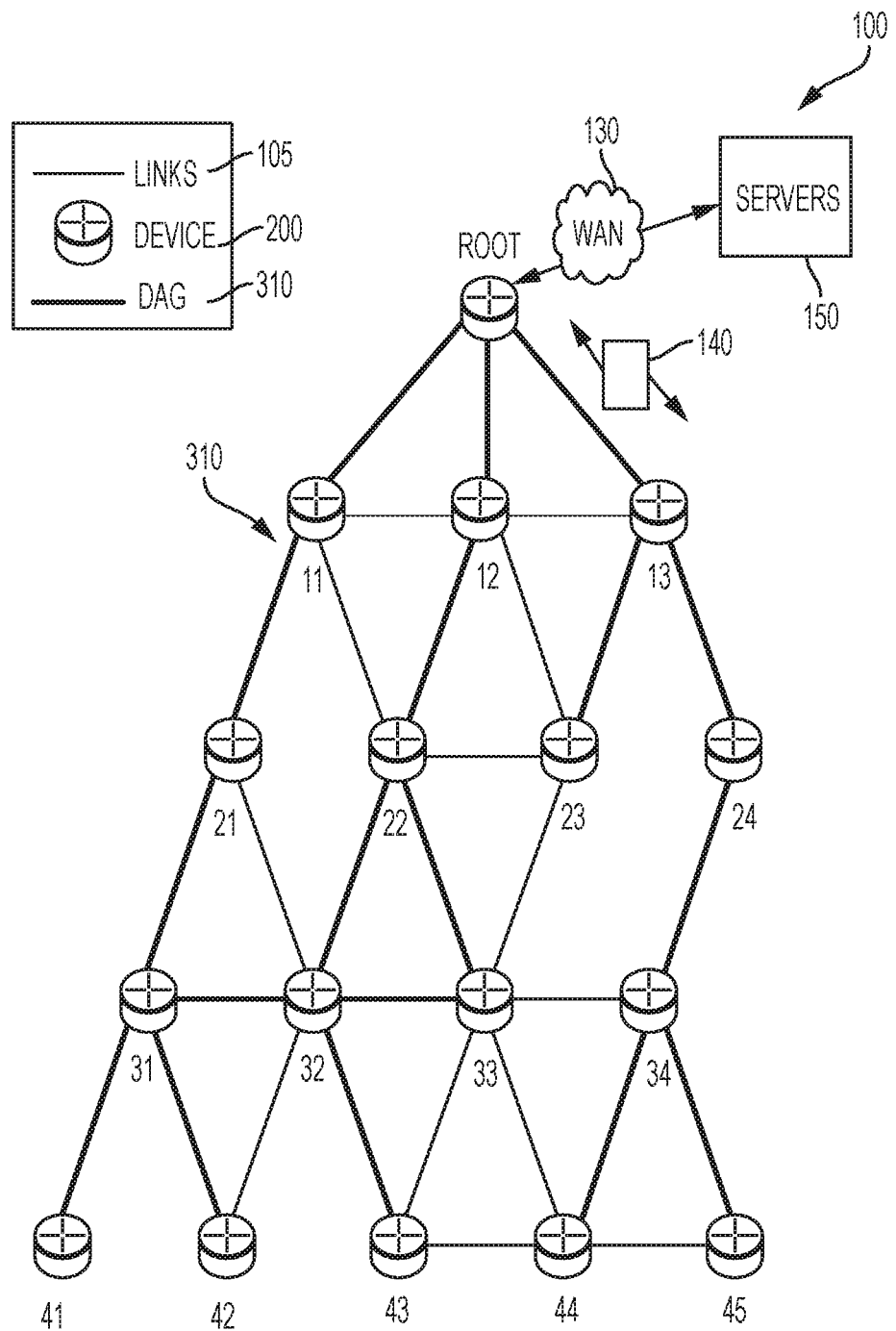
FIG. 3 illustrates an example directed acyclic graph (DAG) in the communication network.

FIG. 3 illustrates an example simplified DAG 310 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic (e.g., in the form of data packets 140 in FIGS. 1, 3 and 4B) may then traverse the DAG 310 in either the upward direction toward the root or downward toward the leaf nodes, particularly as described herein.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a route discovery mechanism to build a logical representation of the network, and route dissemination to establish state within the network so that routers know how to forward packets toward their ultimate destination (such "route discovery" mechanisms are distinct from "neighbor discovery" protocols that enable a network device to discover a single-hop neighbor within, for example, its wireless propagation area (400 of FIG. 4A)). Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG.

Control messages may be transmitted among the devices within the network for discovery and route dissemination when building a DAG.

According to the illustrative RPL routing protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that can convey destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG 310 can be created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message can be sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Loss of Parent

As noted above, RPL is a routing protocol that may be used to form a DAG 310 in a data network 100. If/when a RPL router device 200 loses its last parent and becomes an "orphan" (i.e., a network device that fails to have a parent network device providing reachability to the RPL root), in conventional implementations the recovery process by the orphaned RPL device needs a significant amount of time to poison the subgraph for the child network devices attached to the orphaned RPL router device. Some or all data traffic can be lost during the significant time associated with the recovery process: such loss of data traffic during the recovery process is unacceptable in new RPL/6TiSCH applications, such as industrial networking, etc. where a loss of a data packet can result in severe consequences.

Figure 4A:
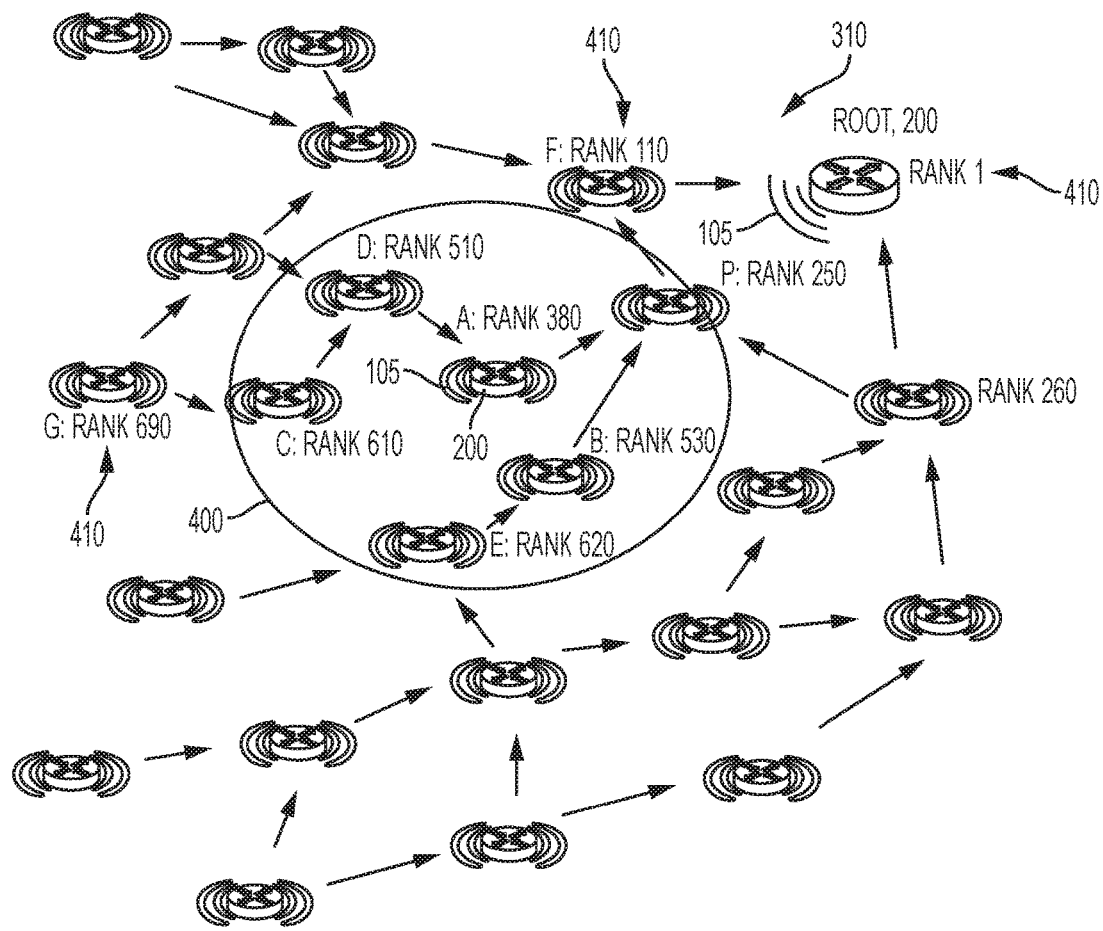
FIGS. 4A-4C illustrate an example apparatus poisoning of child nodes.

For example, FIG. 4A illustrates an example network including one or more RPL routers 200. Consider, as an initial situation: 1) rank 410 is computed on some metric (e.g., LQI); 2) the network node "A" 200 (having a corresponding rank "380" 410 in the DAG 310) has a single parent "P" (having a corresponding rank of "250" 410 in the DAG 310) within its wireless propagation area 400; and 3) network node "A" can hear (i.e., wirelessly detect) network nodes "D" and "C" within its wireless propagation area 400, which are children in its sub-DAG; network node "A" also can wirelessly detect network nodes "B" and "E" within its wireless propagation area 400, which are not in its sub-DAG because they are connected within the DAG topology 310 via an alternate parent "P".

Figure 4B:
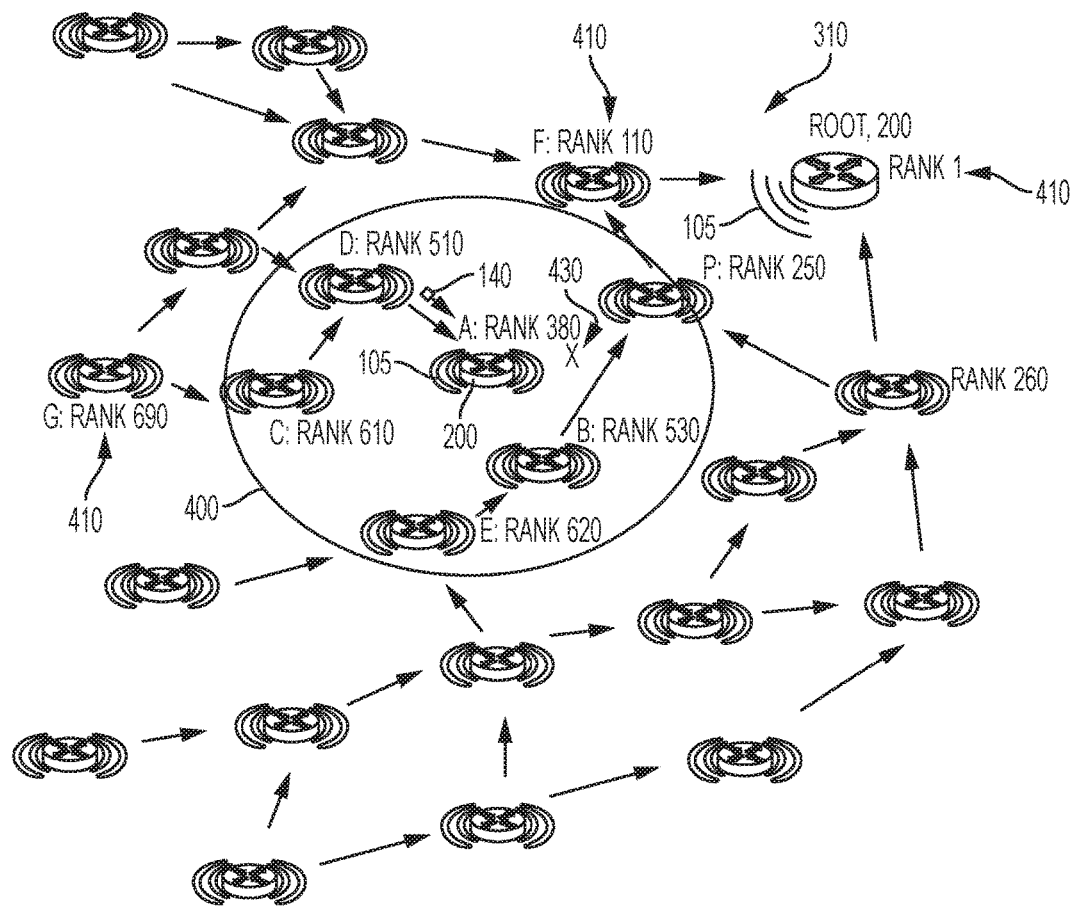

Further, as illustrated in FIG. 4B, assume that the radio connectivity between node "A" and its sole parent network device "P" dies such that there is a loss 430 in the connection (e.g., due to interference) between the network node "A" and its sole parent network device "P". Node "A" therefore has lost its only feasible parent and has now become an orphan node. As a result, neighbors of network node A, which are all deeper (i.e., higher in rank), cannot reattach without risking a loop. For example, attaching to node D and node C would create a loop. Attaching to node E or node B would not create a loop. However, network node "A" does not know.

Figure 4C:
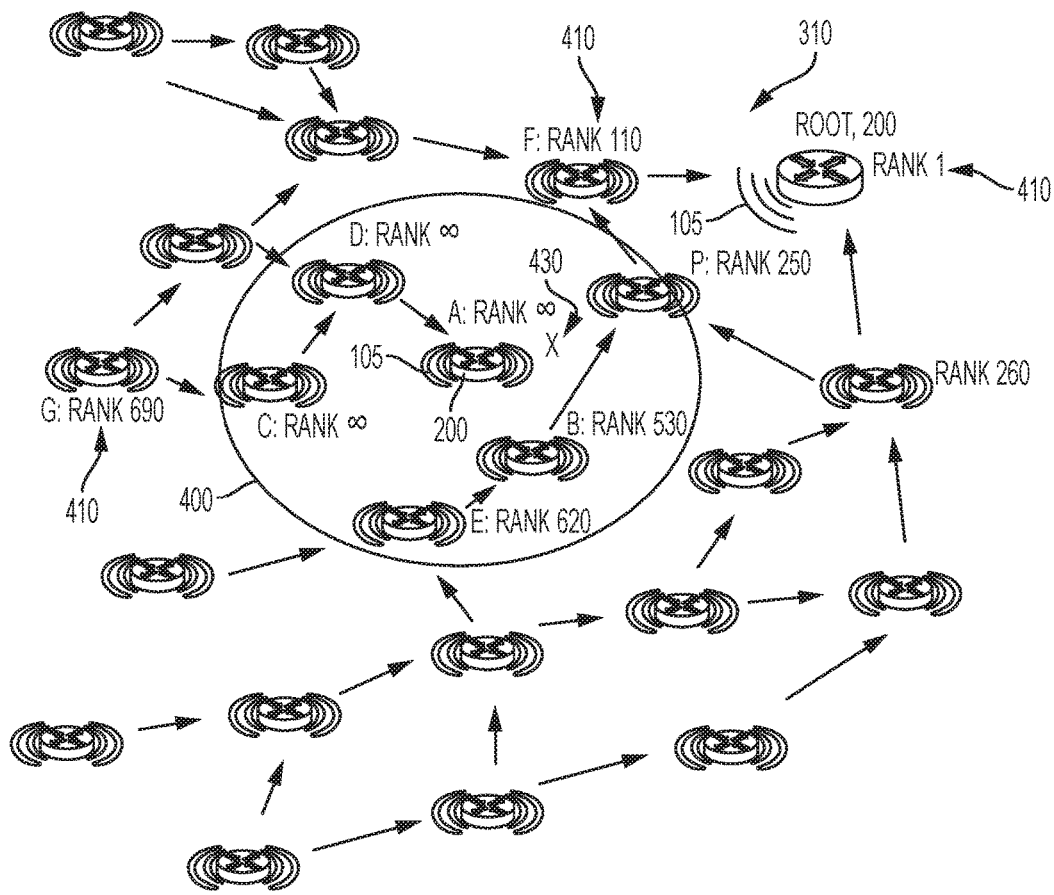

A conventional deployment according to RPL RFC 6550 would require that network node "A" detach, poison by sending a poisoning DIO specifying an infinite rank, and wait for the results of the poisoning. A potentially preferably alternative would be to form a floating DAG, which would spread the poisoning differently with the advantage to maintain the shape of the DODAG in place. As illustrated in FIG. 4C, after some time, the devices that are within the subDAG of network node "A" are mostly poisoned (based on propagating the poisoning DIO advertising an infinite rank "∞" or "0xFFFF" 410) or re-parented elsewhere. From that point, RPL requires that the poisoned nodes (i.e., nodes "A", "D" and "C") can all re-parent based on waiting for detecting another DIO message propagated from the RPL root, and then eventually the network would be fixed. However, as is clear from this illustrated example, this overall process may take a significant amount of time. Routing interruption is disruptive to network traffic, which can be unacceptable in some situations, e.g. industrial.

Moreover, there is no guarantee that all the children in the subDAG of the orphaned RPL node "A" 200 will detect the poisoned DIO advertising the infinite rank: if, for example, the network device "C" does not detect the poisoned DIO from either its parent device "D" or the orphaned RPL node "A" 200, the network device "C" still may improperly advertise an improper DIO specifying its existing rank "610" 410. Moreover, the orphaned RPL network node "A" 200 may not be aware that the network devices "C" or "D" are in its subDAG in either non-storing mode or storing mode, because in certain deployments a child network device may be configured (or may decide) to not send a DAO (e.g., to conserve battery power). Hence, the orphaned RPL node "A" 200 could improperly attach to the network device "C" based on the assumption that the improper DIO output by the network device "C" and detected by the orphaned RPL network node "A" 200 advertises reachability to the root device, when in fact none of the network devices "A", "D", or "C" have any connection to another network device in the DAG topology 310.

Fast RPL Local Recovery

FIGS. 5-8B illustrate example embodiments providing fast local recovery and repair in the data plane for a RPL node "A" (e.g., a router) that has become an orphan after losing its only feasible parent.

According to one or more embodiments of the disclosure as described in detail below, the techniques herein provide for fast local RPL recovery in a low power and lossy network (LLN). The data plane is used to maintain some traffic when the RPL router "A" 200 becomes an orphan by eliminating children from the list of forwarders and by finding successors (i.e., successor parents) that can be used for re-parenting for fast recovery to reach the RPL root in the DAG 310. In this way, if/when the orphaned RPL node "A" 200 loses its last feasible parent, data loss can be avoided and the re-parenting process can be sped up (i.e., accelerated) in a situation of local repair.

Illustratively, the techniques described herein may be performed by hardware, software, and/or firmware, such as in accordance with the process 246/246a and 248/248a, which may contain computer executable instructions executed by the processor circuit 220 (or independent processor of interfaces 210) to perform functions relating to the techniques described herein, e.g., in conjunction with routing process 244. For example, the techniques herein may be treated as extensions to conventional protocols, such as the various wireless communication protocols, and as such, may be processed by similar components understood in the art that execute those protocols, accordingly.

Operationally, the techniques described herein may include a process for maintaining forwarding by the orphan node, described in more detail below. In other embodiments, the techniques may include a fast parent selection process by the orphan node, also described in more detail below. While these processes may be used separately, they are not antagonistic and, as such, they may be used together in various embodiments.

Method to Maintain Forwarding by an Orphan Node

Figure 5:
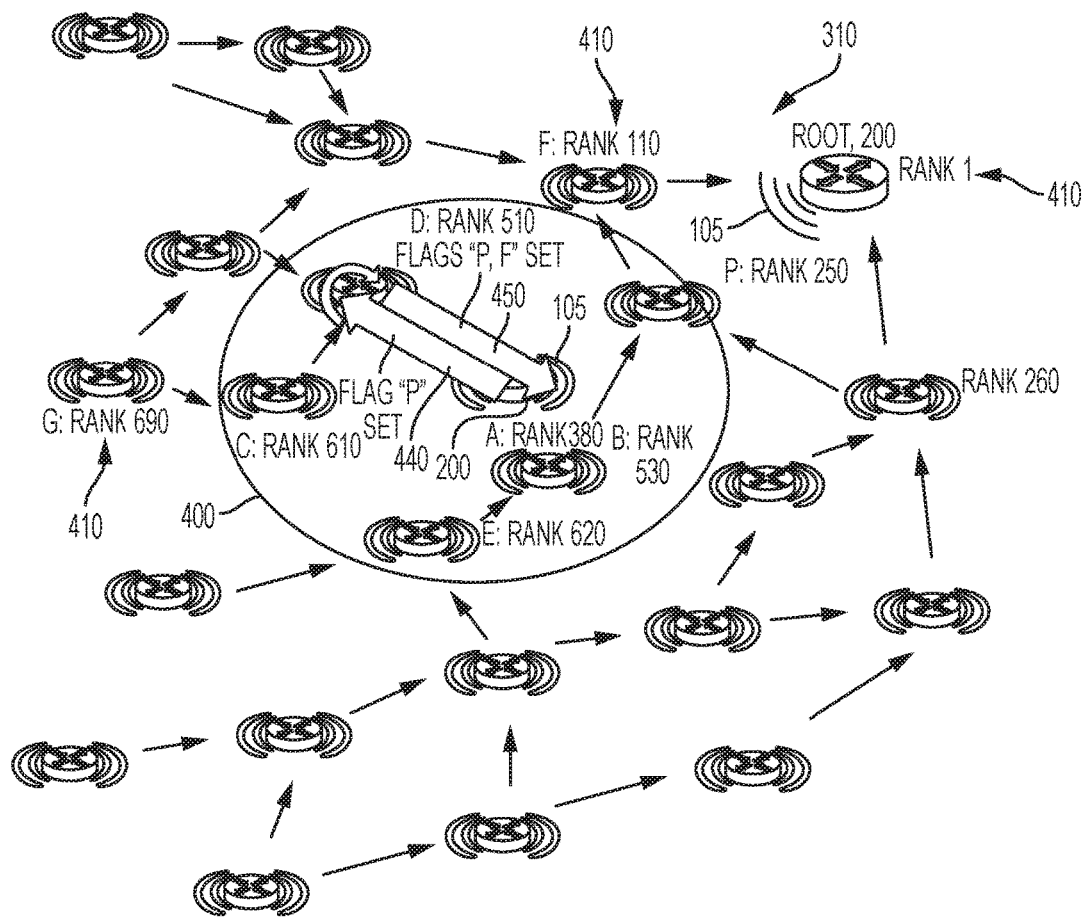
FIG. 5 illustrates an example method of maintaining forwarding by an orphan node, while eliminating child nodes causing loops, according to an example embodiment.

FIG. 5 illustrates in further detail an example method of maintaining forwarding by an orphaned RPL node "A" 200. In particular, the goal of this method is for node A, having lost its last feasible parent, to attempt (i.e., try and continue) forwarding via other neighbors using the data path to eliminate the loops and discover some of the unfeasible nodes. The maintaining forwarding is particularly effective if the orphaned RPL node "A" 200 has a configuration that is optimized for low power, i.e., minimal operation and overhead.

Figure 7A:
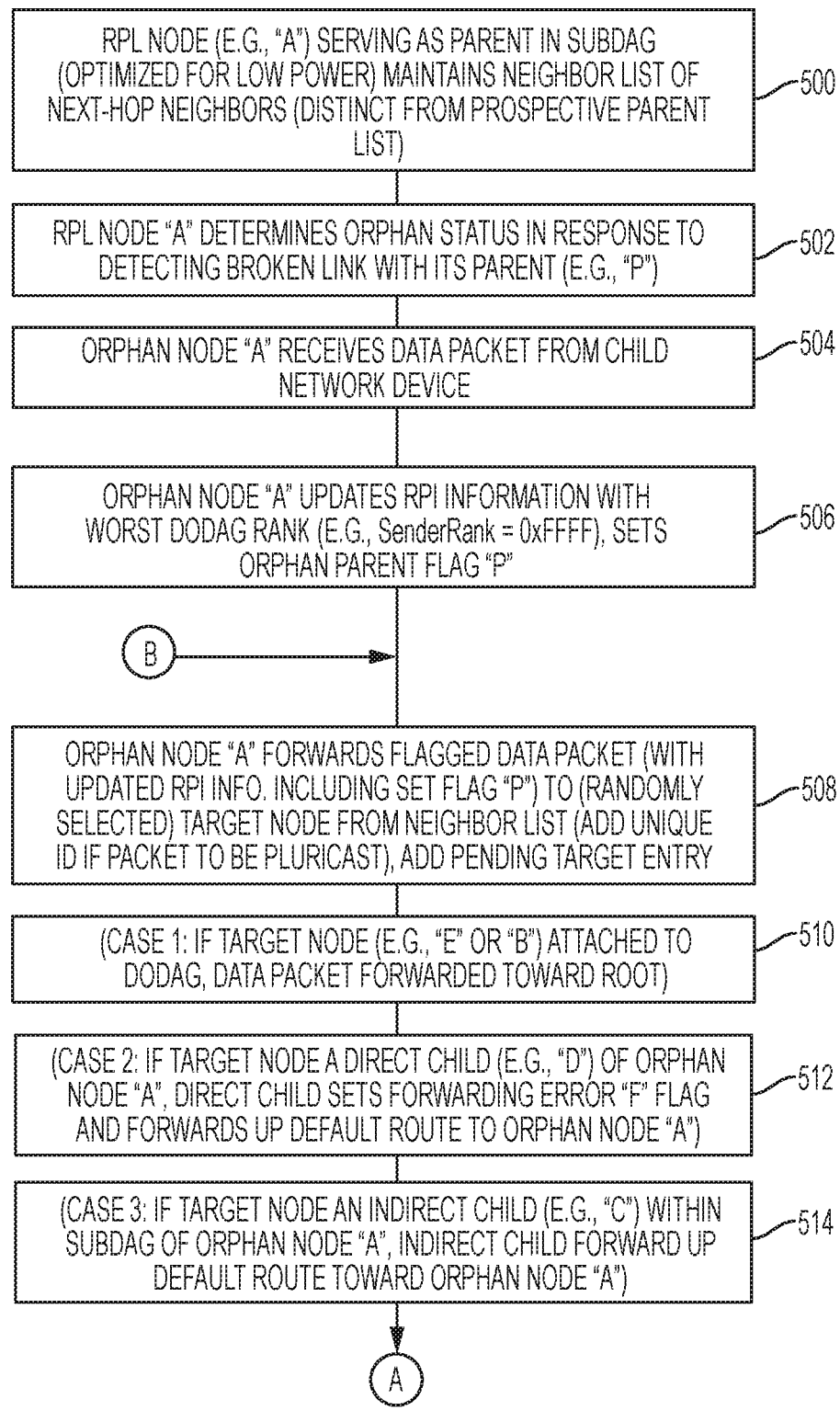
FIGS. 7A-7B illustrate in further detail the maintaining forwarding by the orphan node, according to an example embodiment.

As illustrated in FIGS. 5 and 7A, specific embodiments of this technique include:

Network node "A" 200 may select a number of neighbors as prospective parents. For example, the RPL network node "A" 200 in operation 500 (FIG. 7A) can maintain a neighbor list of next hop neighbors that are detectable within its wireless propagation area 400, based on detecting its next-hop neighbor according to a neighbor discovery protocol such as 6LoWPAN discovery according to the IETF RFC 6775; the RPL network node "A" 200 also can add entries to the neighbor list in response to receiving DIO messages from network devices that cannot be its RPL parent in the DAG topology 310 because the network devices advertise a worse rank than the corresponding rank "380" of the RPL network node "A" 200. The RPL network node "A" 200 can maintain a neighbor list of its next-hop neighbors distinct from any other data structure such as any potential parent list used to identify available parents in the DAG topology 310.

The RPL network node "A" 200 can detect in operation 502 of FIG. 7A its orphan status in response to detecting the broken link with its parent device "P" causing the lost connection 430 illustrated for example in FIG. 4B. Assuming with respect to FIGS. 7A and 7B that the orphaned RPL network node "A" 200 is optimized for low power, the orphaned RPL network node "A" 200 can decide to take no action in response to the detected lost connection 430 until receiving in operation 504 a data packet (140 of FIG. 4B) from its child network device (e.g., "D") 200. Typically data packet 140 transmitted by the child network device can specify in its RPL Packet Information (RPI) field (per Section 11.2 of RFC 6550) a "Down" flag ("O=0") that is reset to zero to indicate that the data packet 140 is to be transmitted up the DAG topology 310 toward the root network device.

In response to receiving in operation 504 the data packet 140 from its child network device (e.g., "D"), the orphaned RPL network node "A" 200 in operation 506 can modify the received data packet 140 into a flagged copy 440 of the data packet based on modifying the RPI field specified in the received data packet 140. For example, the data packet 140 transmitted by the child network device "D" includes within its RPI fields a rank field that identifies the corresponding rank 410 of the child network device "D" ("SenderRank=510"): the orphaned RPL network node "A" 200 in operation 506 can set the rank field ("SenderRank") in the flagged copy 440 to a "worst-rank" value that is higher than any other rank in the DAG topology 310 (e.g., "SenderRank=0xFFFF"), as opposed to the prior rank "380" of the orphaned RPL network node "A" 200 (in another embodiment, the orphaned RPL network node "A" 200 can set the rank field to "SenderRank=0xFFFE").

The orphaned RPL network node "A" 200 in operation 506 also can set in the flagged copy 440 of the data packet a new RPI flag "P", also referred to herein as a "loop detection flag", that may be created for re-parenting loop detection. As described below, the loop detection flag "P" enables the orphaned RPL network node "A" 200 to detect whether the flagged copy 440 of the data packet is returned to the orphaned RPL network node "A" 200 by a child device in its subDAG.

The orphaned RPL network node "A" 200 in operation 508 can generate a prospective parent list that is at least a subset of its neighbor list (described above with respect to operation 500): the orphaned RPL network node "A" 200 in operation 508 can forward as a unicast transmission the flagged copy 440 of the data packet (specifying the worst-case rank value (e.g., "SenderRank=0xFFFF") and the loop detection flag "P") to one or more randomly-selected neighboring network devices from the neighbor list. As illustrated in FIG. 5, the orphaned RPL network node "A" 200 in operation 508 can forward the flagged copy 440 of the data packet to the neighboring device "D".

The orphaned RPL network node "A" 200 also can store in its memory circuit 240 a pending target entry identifying each neighboring network device having been unicast transmitted a flagged copy 440 of the data packet, along with any unique identifier for each flagged copy 440 of the data packet if transmitted to multiple neighboring devices: as described previously, the orphaned RPL network node "A" 200 may not be aware of the identities of the child network devices within its subDAG. As described below, the pending target entry enables the orphaned RPL network node "A" 200 to identify whether the corresponding neighboring device having received the flagged copy 440 of the data packet is a network device attached within the DAG topology 310 and having reachability to the DAG root (case 1 in operation 510), a direct child (case 2 in operation 512) or an indirect child within its subDAG (case 3 in operation 514).

For example, if in operation 510 (case 1) the neighboring network device receiving the flagged copy 440 of the data packet is attached to the DAG topology 310 (e.g., network device "E" or "B" attached via the network device "P"), the worst-case rank value (e.g., "SenderRank=0xFFFF") specified in the flagged copy 440 of the data packet ensures that any network device 200 attached to the DAG topology 310 will send the flagged copy 440 of the data packet up toward the root network device (after updating the "SenderRank" value in the RPI field with the corresponding rank 410 of the device receiving the flagged copy 440 of the data packet). Hence, reception of the flagged copy 440 of the data packet by a neighboring network device attached to the DAG topology 310 enables the data packet 140 from the network device "D" to be forwarded into the DAG topology 310, even though the orphaned RPL network node "A" 200 has lost its connection to its parent "P".

If in operation 512 (case 2) the neighboring network device receiving the flagged copy 440 of the data packet is a direct child that is directly attached to the orphaned RPL network node "A" 200 (e.g., network device "D" 200), the direct child (e.g., "D") can detect (e.g., from its default parent list or RPL parent list) that the flagged copy 440 of the data packet is from its parent network device and set in operation 512 the forwarding error flag "F", for example in response to detecting that the "Down" flag reset to zero and the "SenderRank=0xFFFF" is inconsistent with the identity stored by the network device "D" (having rank "510") relative to its parent (having rank "380) (in accordance with Section 11.2 of RFC 6550). The direct child "D" can send in operation 512 the updated flagged copy as a second packet 450 (having the "F" flag and "P" flag set) to its parent network device "A". Hence, a network node (e.g., "D") that receives a flagged copy 440 of the data packet with RPI "P" flag from a parent may return it with the RPI "F" flag set (as defined in RFC 6550 in Section 11.2), indicating a forwarding error; as described below, the orphaned RPL network node "A" 200 may remove the child "C" from the prospective parent list.

If in operation 514 (case 3) the neighboring network device receiving the flagged copy 440 of the data packet is an indirect child (e.g. "C") within the subDAG of the orphaned RPL network node "A" 200, the indirect child in operation 514 can update the sender rank (e.g., "SenderRank=610") and forward the data packet (including the "P" flag set) to its default parent device "D", which in turn can send the data packet to the orphaned RPL network node "A" 200.

Figure 7B:
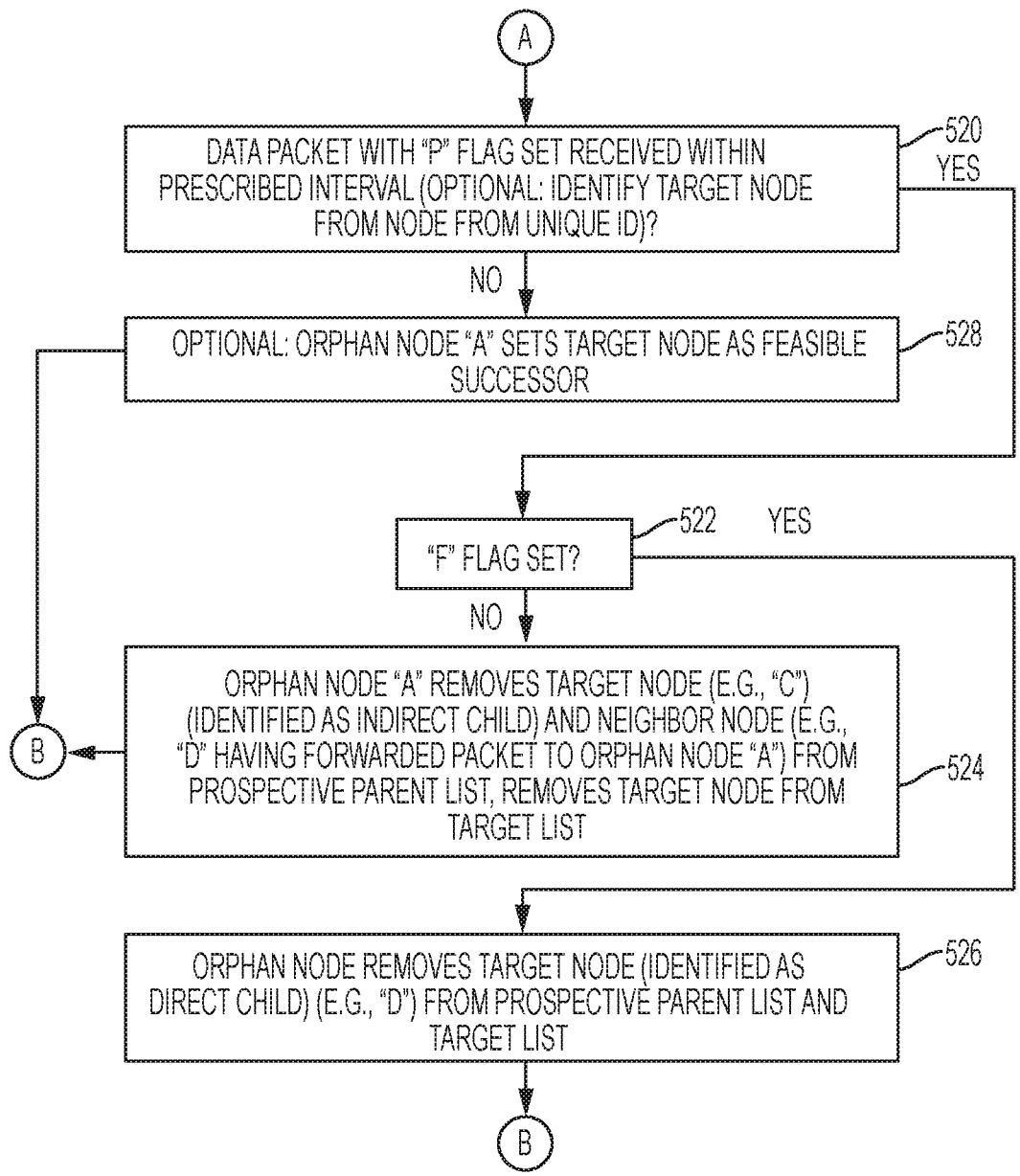

Referring to FIG. 7B, assume in operation 520 that the orphaned RPL network node "A" 200 receives, within a prescribed time interval, the second data packet 450 transmitted by the network device "D": the orphaned RPL network node "A" 200 can determine in operation 520 that the second data packet 450 is a forwarded copy of the flagged copy 440 of the data packet in response to detecting that the loop detection flag "P" is set. Hence, the orphaned RPL network node "A" 200 can determine in operation 520 the flagged copy 440 of the data packet is from one of the child network devices in its subDAG in response to detecting the detecting the "P" flag set. The orphaned RPL network node "A" 200 also can optionally detect the target network device that received the unicast transmission of the flagged copy 440 of the data packet from the orphaned RPL network node "A" 200, based on the corresponding unique identifier in the received second data packet 450 that the orphaned RPL network node "A" 200 can use to identify the corresponding pending target entry generated in operation 240.

The orphaned RPL network node "A" 200 in operation 522 can determine whether the forwarding error "F" flag is set in the received data packet: if the forwarding error "F" flag is not set, the orphaned RPL network node "A" 200 in operation 524 can determine the target network device was an indirect child (e.g., "C") according to case 3 in operation 514 (based on the corresponding pending target entry, and in response delete (i.e., remove) the target network device (e.g., "C") and the direct child "D" from the prospective parent list, and remove the target node (e.g., "C") from the target list. The orphaned RPL network node "A" 200 can repeat operation 508 for the next randomly selected target node from the prospective parent list.

If in operation 522 the orphaned RPL network node "A" 200 determines the forwarding error "F" flag is set, the orphaned RPL network node "A" 200 in operation 526 can determine the target network device was a direct child (e.g., "D") according to case 2 in operation 512, and in response delete (i.e., remove) the target network device (e.g., "D") from the prospective parent list and the target list that tracks one or more pending transmissions of the flagged copy 440 of the data packet. The orphaned RPL network node "A" 200 can repeat operation 508 for the next randomly selected target node from the prospective parent list.

If in operation 520 the orphaned RPL network node "A" 200 determines that no data packet with its "P" flag set is received within a prescribed time interval (corresponding to case 1 in operation 510), i.e., there is a "timeout" for a single target node entry in the potential parent list, the orphaned RPL network node "A" 200 can conclude that the target node is attached to the DAG topology 310 and optionally set in operation 528 the target node as a possible feasible successor. Hence, the orphaned RPL network node "A" 200 can ensure that any data packet 140 received from a child device can be forwarded via any possible feasible successor until the orphaned RPL network node "A" 200 can re-parent into the DAG topology 310 (i.e., attach to a new parent according to the existing protocols of RPL). The orphaned RPL network node "A" 200 also can repeat operation 508 to determine whether any additional node in the prospective parent list is a "better" parent having a better (lower) rank than the existing possible feasible successor.

Hence, the orphaned RPL network node "A" 200 can cache any received data packet 140 until at least it has detected a possible feasible successor, enabling the data packet 140 to be forwarded to the root network device while the children in the subDAG are removed from the prospective parent list. Hence, even though a period of uncertainty may start during which the orphaned RPL network node "A" 200 does not know which successors can be used, and even though the orphaned RPL network node "A" 200 needs to forward packets, the period of uncertainty ends after the prescribed time interval where the orphaned RPL network node "A" 200 can discover in operation 528 a feasible successor parent device. As described previously, during that period of uncertainty during the prescribed time interval in operation 520, the orphaned RPL network node "A" 200 can retransmit any packet coming back with the RPI "P" flag on to another neighboring device in an attempt to reach the root network device.

Method for Fast Parent Selection by an Orphan Node

The maintain forwarding process described above and illustrated in FIGS. 5 and 7A, 7B may, in some embodiments, be limited if only unfeasible parent nodes are discovered (i.e., direct children and grand children in the subDAG). Hence, according to an example embodiment, the orphaned RPL network node "A" 200 can unicast transmit (in the forwarding plane) a message to one of its identified neighboring network devices that is intended for the DAG root: the message can specify a request for the DAG root to send a response via the one identified neighboring network device. Hence, the orphaned RPL network node "A" 200 can execute fast parent selection in response to receiving the response via the one neighboring network device identified in the request. Hence, example embodiments enable the orphaned RPL network node "A" 200 to locate, in the forwarding plane, real feasible parents without the necessity of waiting for the relatively slower RPL control plane. Moreover, the orphaned RPL network node "A" 200 can locate the feasible parents proactively in response to detecting the lost connection 430, such that one or more feasible parents could be located by the orphaned RPL network node "A" 200 before any data packet 140 is forwarded by a child network device.

FIGS. 6A-6C and 8A, 8B illustrate an example method for fast parent selection by an orphaned RPL node "A" 200. The network node "A" 200 (optimized, for example for proactively maintaining a path to the RPL root) may select a number of neighbors as prospective parents. As described previously with respect to operation 500 of FIG. 7A, the RPL network node "A" 200 in operation 600 (FIG. 8A) can maintain a neighbor list of next hop neighbors that are detectable within its wireless propagation area 400, based on detecting its next-hop neighbor according to a neighbor discovery protocol such as 6LoWPAN discovery according to the IETF RFC 6775; the RPL network node "A" 200 also can add entries to the neighbor list in response to receiving DIO messages from network devices that cannot be its RPL parent in the DAG topology 310 because the network devices advertise a worse rank than the corresponding rank "380" of the RPL network node "A" 200. The RPL network node "A" 200 can maintain a neighbor list of its next-hop neighbors distinct from any other data structure such as any potential parent list used to identify available parents in the DAG topology 310.

Figure 8A:
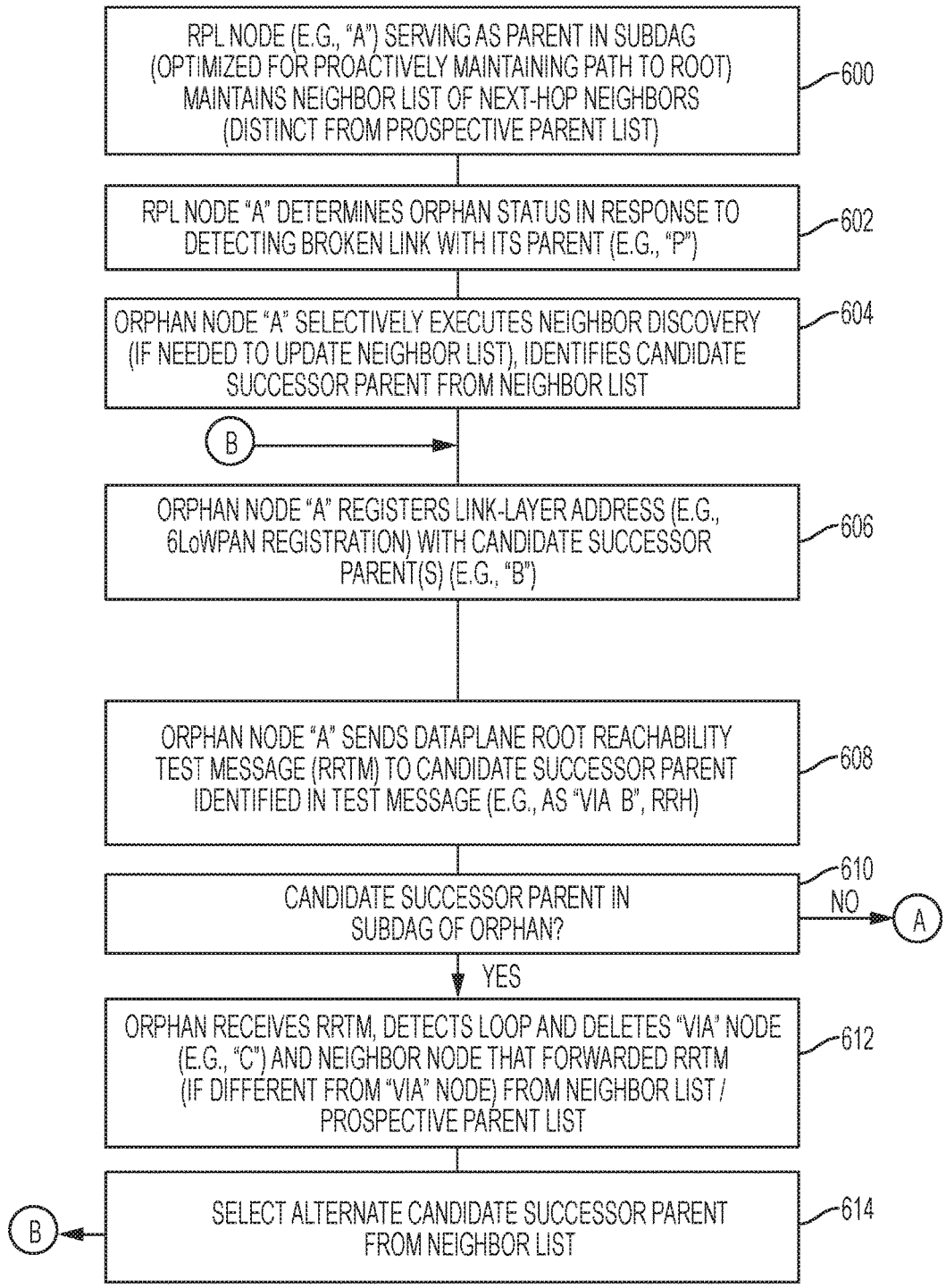
FIGS. 8A-8B illustrated in further detail the example method for fast parent selection by an orphan node according to an example embodiment.
Figure 8B:
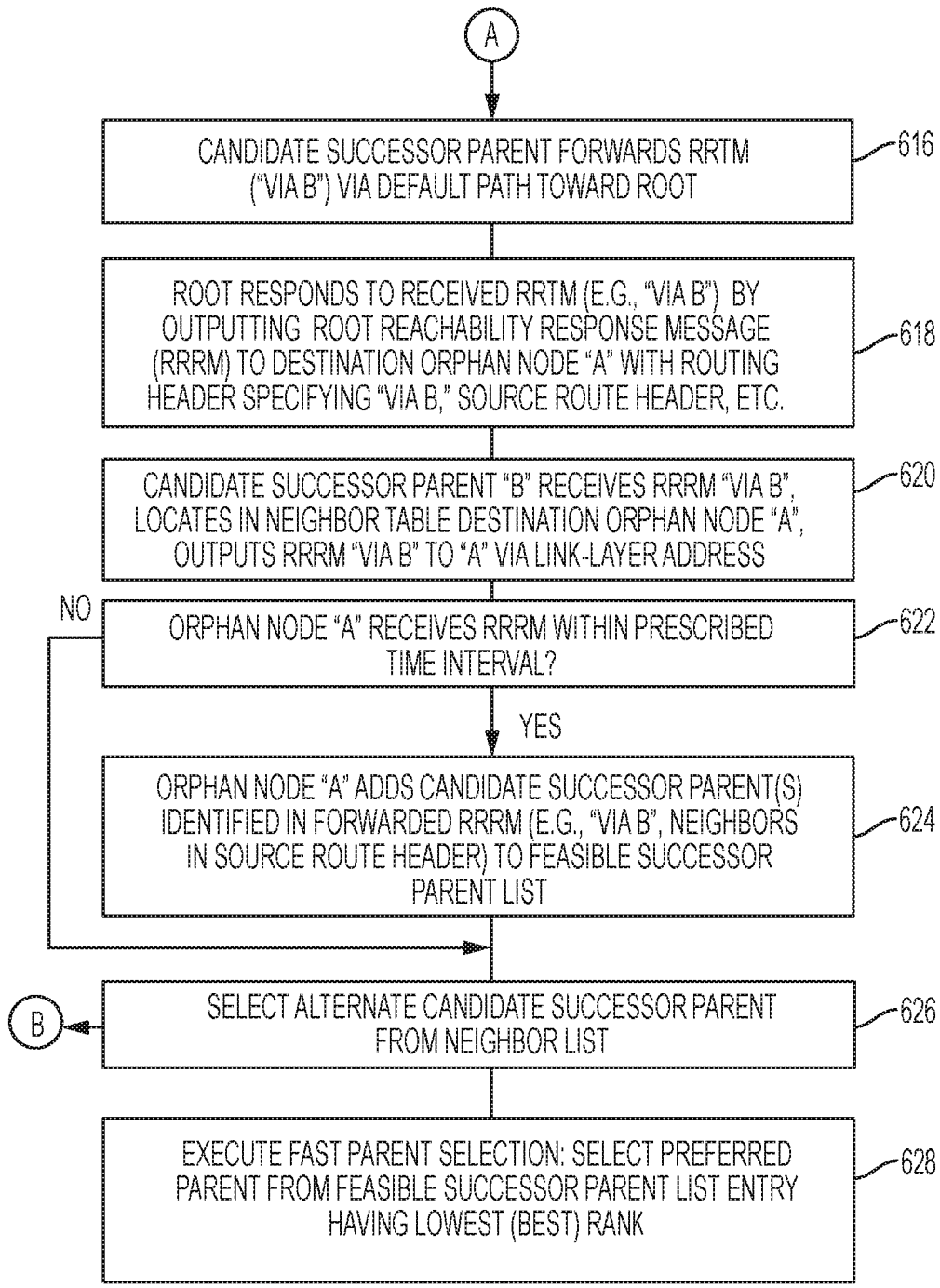

The RPL network node "A" 200 can detect in operation 602 of FIG. 8A its orphan status in response to detecting the broken link with its parent device "P" causing the lost connection 430 illustrated for example in FIG. 4B. The orphaned RPL network node "A" 200 in operation 604 can selectively execute neighbor discovery, if needed to update is neighbor list, and the orphaned RPL network node "A" 200 in operation 508 can generate a prospective parent list (i.e., a candidate successor parent list) that is at least a subset of its neighbor list generated in operation 600.

The orphaned RPL network node "A" 200 in operation 606 can register its link-layer address (e.g., EUI-64) address with one or more of the neighboring network devices identified in the candidate successor parent list. In one embodiment, the orphaned RPL network node "A" 200 can register with one or more neighboring network devices (e.g., "B", "C", "D", and/or "E") based on unicast transmission of a neighbor solicitation message specifying an Address Registration Option (ARO) according Section 4.1 of RFC 6775, enabling the targeted neighboring network device (e.g., "B") to determine that the orphaned RPL network node "A" 200 is reachable via the corresponding link-layer address of the orphaned RPL network node "A" 200.

Figure 6A:
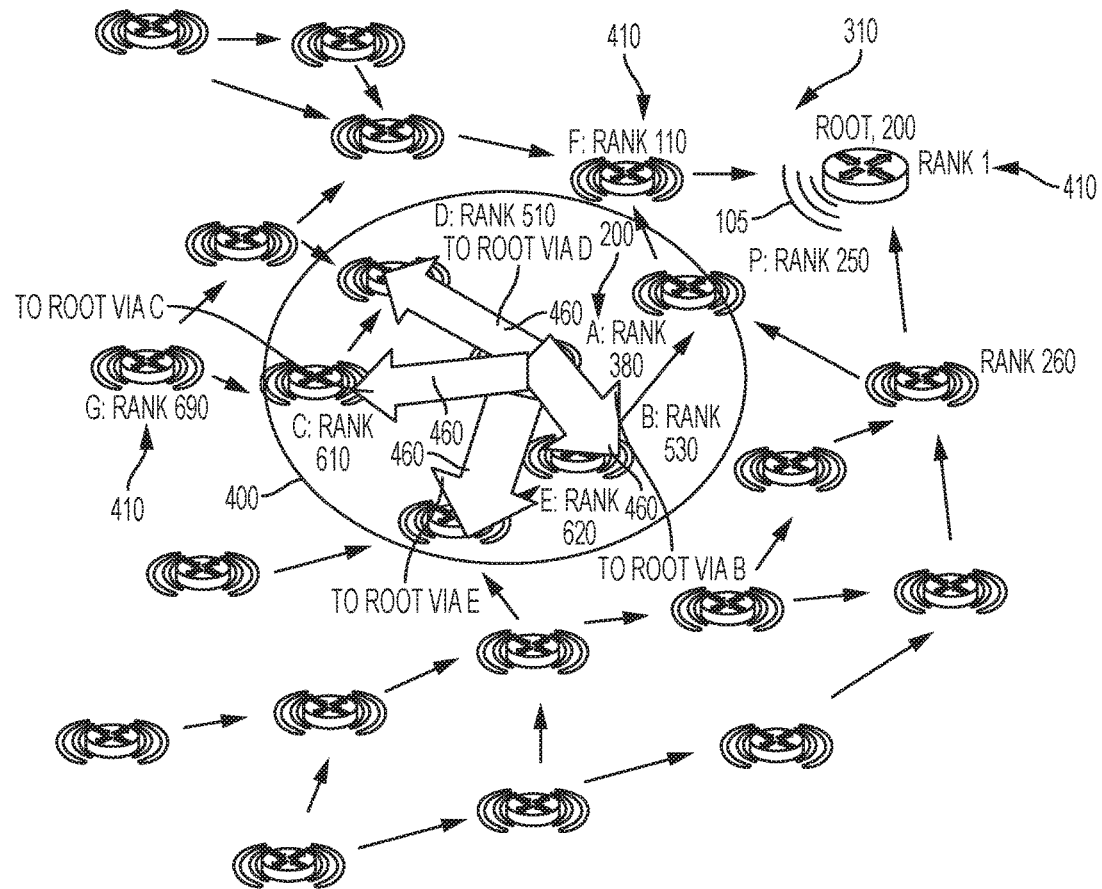
FIG. 6A-6C illustrate an example method for fast parent selection by an orphan node according to an example embodiment.

The orphaned RPL network node "A" 200 in operation 608 can output via unicast transmission via the data plane a root reachability test message (RRTM) 460, implemented for example as a new Operations, Administration and Management (OAM) frame: the orphaned RPL network node "A" 200 in operation 608 inserts into the root reachability test message 460 a request for the RPL root to send a response to the orphaned RPL network node "A" 200 via a neighboring network device identified in the root reachability test message 460. As illustrated in FIG. 6A, the neighboring network device targeted for unicast reception of the root reachability test message 460 is identified by the orphaned RPL network node "A" 200 as a "via" device, where the root reachability test message 460 transmitted to the neighboring network device "B" specifies "via B", the root reachability test message 460 transmitted to the neighboring network device "C" specifies "via C", the root reachability test message 460 transmitted to the neighboring network device "D" specifies "via D", and the root reachability test message 460 transmitted to the neighboring network device "E" specifies "via E". In an alternate embodiment, the root reachability test message 460 can specify a reverse routing header (RRH) as described in U.S. Pat. No. 7,209,978, enabling each network device 200 receiving the root reachability test message 460 to add its corresponding network address (e.g., Internet Protocol version 6 (IPv6) as the root reachability test message 460 propagates toward the RPL root. Use of the reverse routing header may help eliminate all non-unfeasible successors on a loop path in one shot (i.e., in one iteration).

Figure 6B:
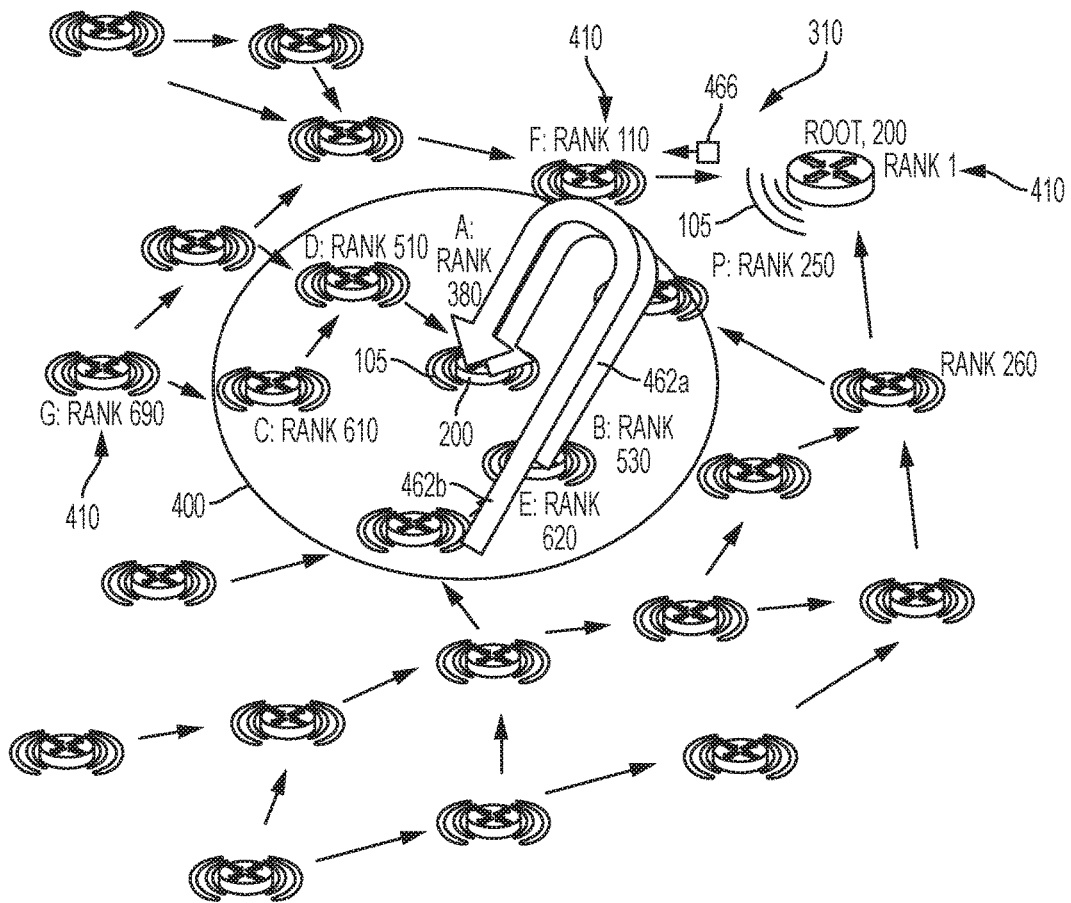

Hence, as illustrated in FIG. 6B, the root reachability test message 460 enables any neighboring network device attached to the DAG topology 310 (e.g., "B", "E") to forward the root reachability test message 460 to the DAG root, enabling the DAG root to send a response along the available paths 462a, 462b (via "B" and "E"), respectively, back to the orphaned RPL network node "A" 200.

If in operation 610 the root reachability test message 460 is received by a candidate successor parent that is a child device in the subDAG of orphaned RPL network node "A" 200 (e.g., "C" or "D"), the root reachability test message 460 is eventually received in operation 612 by the orphaned RPL network node "A" 200. The orphaned RPL network node "A" 200 in operation 612 responds to reception of the root reachability test message 460 by identifying the candidate successor parent (by the "via" identifier and/or RRH), identifying the neighbor node that forwarded the root reachability test message 460 (if different from the "via" identifier), and deleting the candidate successor parent and the neighbor node from the neighbor list and the prospective parent list. The orphaned RPL network node "A" 200 in operation 614 can select an alternate candidate successor parent from its prospective parent list and/or neighbor list.

Figure 6C:
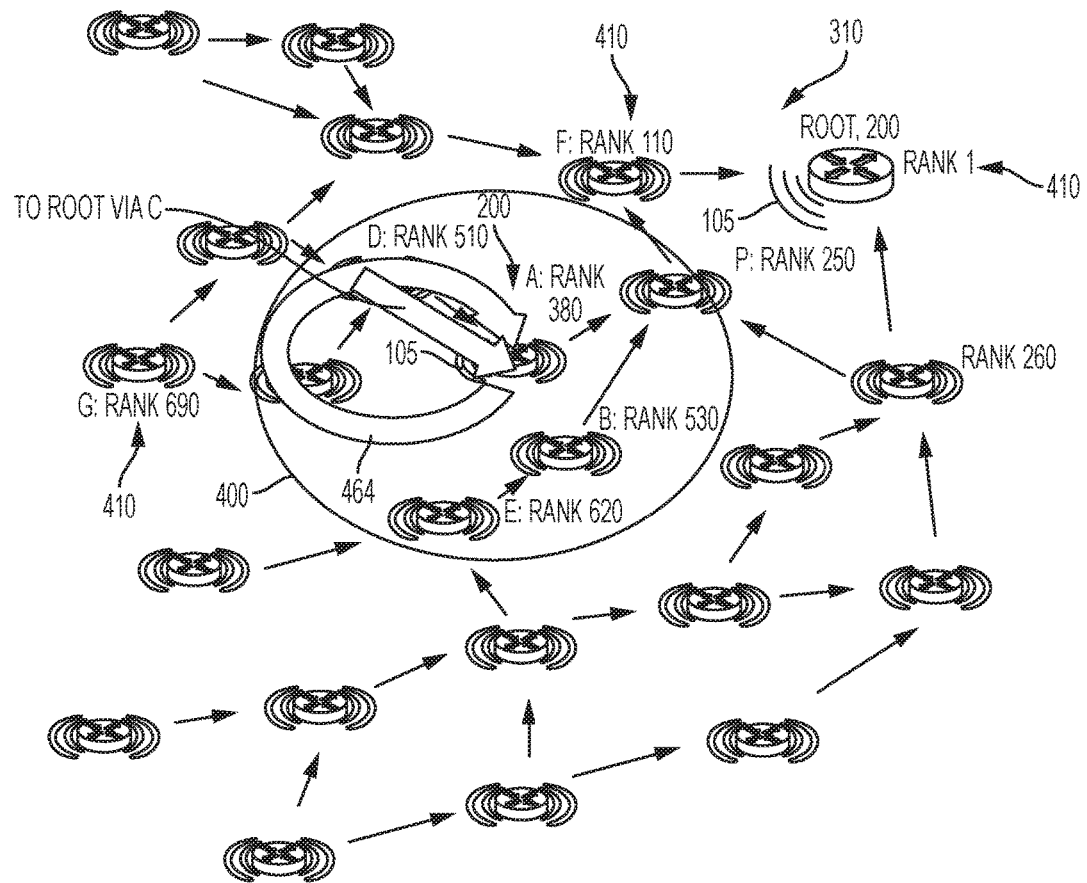

Hence, as shown in FIG. 6C, in the root reachability test message 460 sent to network node "C", the return path 464 includes network node "D", and both child network devices "C" and "D" can be identified in the reverse routing header (RRH) and can be eliminated in operation 612 from the prospective parent list in response to the looped message being received by the orphaned RPL network node "A" 200. As illustrated in FIG. 6C, the orphaned RPL network node "A" 200 also can recognize child devices in its subDAG (e.g. source address is node A, a new flag in RPI), and may eliminate the neighbor indicated in the packet from the list of potential parents (i.e., prospective parents).

As described previously, the orphaned RPL network node "A" 200 in operation 608 can unicast send a corresponding version of the root reachability test message 460 to all its selected neighbors specified in the prospective parent list, including the network devices "B" and "E" that are connected to the DAG topology 310. If in operation 610 the candidate successor parent receiving the corresponding unicast root reachability test message 460 is not in the subDAG of the orphaned RPL network node "A" 200 (e.g., "B" or "E"), then referring to FIG. 8B the candidate successor parent (e.g., "B" or "E") in operation 616 can forward the root reachability test message 460 toward the DAG root via its default path, illustrated as 462a, 462b in FIG. 6B. The DAG root in operation 618 can detect in the root reachability test message 460 the request for sending a response via the corresponding neighboring network device (e.g., "via E", "via B", or via the reverse routing header), and in response the DAG root can determine from its RPL routing table (in storing mode or non-storing mode) the path for reaching the "via" device specified in the root reachability test message 460 (optionally, the RPL root can generate a source route header using the reverse routing header in the root reachability test message 460, if available). For example, propagation starting from the neighboring network device "E" can result in the DAG root detecting in the received root reachability test message 460 the reverse routing header specifying the hop-by-hop sequence "E-B-P-F", whereas propagation starting from the neighboring network device "B" can result in the reverse routing header specifying "B-P-F".

Hence, the RPL root in operation 618 can respond to the root reachability test message 460 by generating and outputting a root reachability response message (RRRM) 466 specifies the orphaned RPL network node "A" 200 as the destination, and that specifies a routing header identifying at least the "via" device that is the last-hop neighbor for reaching orphaned RPL network node "A" 200. The root reachability response message 466 (responsive to the root reachability test message 460 output by the orphaned RPL network node "A" 200 to the neighboring network device "B" and optionally received by the RPL root with the reverse routing header "B-P-F") is forwarded down the DAG topology 310 via the return path 462a to the orphaned RPL network node "A" 200 via the neighboring network device "B" (the RRRM 466 optionally including, for example, the source route header "F-P-B"), and the root reachability response message 466 (responsive to the root reachability test message 460 output by the orphaned RPL network node "A" 200 to the neighboring network device "E" and optionally received by the RPL root with the reverse routing header "E-B-P-F") is forwarded down the DAG topology 310 via the return path 462b to the orphaned RPL network node "A" 200 via the neighboring network device "E" (the RRRM 466 optionally including, for example, the source route header F-P-B-E").

In response to each candidate successor parent (e.g., "B", "E") receiving its corresponding root reachability response message 466 via its corresponding return path 462, each candidate successor parent in operation 620 locates in its neighbor table the link layer address for reaching the orphaned RPL network node "A" 200, and outputs in operation 620 the root reachability response message 466 via the link layer connection 105.

In response to the orphaned RPL network node "A" 200 receiving in operation 622 a root reachability response message 466 within a prescribed timeout interval, the orphaned RPL network node "A" 200 in operation 624 can add the corresponding candidate successor parent having transmitted the root reachability response message 466 to the orphaned RPL network node "A" 200 to its feasible successor parent list, based on identifying the "via" identifier in the root reachability response message 466, or via its neighbors that are identified in any source route header in the root reachability response message 466. If desired, the orphaned RPL network node "A" 200 can select in operation 626 an alternate candidate successor and repeat the above-described operations.

Hence, the orphaned RPL network node "A" 200 can identify feasible successors for fast parent selection from the feasible successor parent list in operation 624 as each root reachability response message 466 is received from a neighboring network device. As more root reachability response messages 466 are received, the orphaned RPL network node "A" 200 in operation 628 can execute fast parent selection in operation 628 by selecting a preferred parent having a best (i.e., lowest) rank in the feasible successor parent list.

According to example embodiments, fast local repair can be executed by an orphaned RPL network node, without loss of data packets, based on forwarding a flagged copy of a received data packet to randomly-selected neighboring network devices, and/or outputting via one or more neighboring network devices a request for the root to send a response via an identified neighboring network device. The fast local repair can be executed by the orphaned RPL network node in the data plane, resulting in a substantially faster repair by the orphaned RPL network node compared to relying on existing repair techniques in the control plane as implemented in existing routing protocols. Further, child network devices in the subDAG of the orphaned RPL network node can be identified and removed from lists of feasible successor parent devices.

It should be noted that while certain steps within the processes described above may be optional, certain other steps may be included or excluded as desired. Further, while a particular order of the steps is shown, this ordering is merely illustrative, and any suitable arrangement of the steps may be utilized without departing from the scope of the embodiments herein. Moreover, while the processes are described separately, certain steps from each may be incorporated into the other, and the processes are not meant to be mutually exclusive.

The techniques described herein, therefore, provide fast RPL local recovery, particularly for low power and lossy networks, enabling a new parent to be found faster than with the RPL control plane. In particular, the techniques herein leverage the data plane to maintain some traffic when a RPL router becomes an orphan by eliminating children from the list of forwarders and by finding successors that can be used for re-parenting. In this way, when a RPL node loses its last feasible parent, data loss can be avoided and the re-parenting process can be sped up in a situation of local repair.

While there have been shown and described illustrative embodiments that provide for fast RPL local recovery, it is to be understood that various other adaptations and modifications may be made within the spirit and scope of the embodiments herein. For example, the embodiments have been shown to be particularly useful for low power and lossy network. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (or more generally, machine-readable medium) (e.g., disks, Compact Discs (CDs), RAM, EEPROM, etc.) having program instructions executing on a computer, hardware, firmware, or a combination thereof (more generally referred to herein as a machine). Accordingly this description is to be taken only by way of example and not to otherwise limit the scope of the embodiments herein. Therefore, it is the object of the appended claims to cover all such variations and modifications as come within the true spirit and scope of the embodiments herein.

The term "configured for" or "configured to" as used herein with respect to a specified operation refers to a device and/or machine that is physically constructed and arranged to perform the specified operation.

Although only the network devices "Root" and "A" are labeled with the reference numeral "200" in the Figures to avoid cluttering in the Figures, it should be apparent that all the network devices in the Figures (e.g., "B", "C", "D", "E", "F", "G", "P", etc.) are allocated the reference numeral "200" for purposes of the description herein. Further, it should be apparent that all the network devices in the Figures are configured for establishing wireless data links 105 (illustrated as curved lines radiating from each device), even though only the wireless data links for the network device "A" and the "Root" network device are labeled with the reference numeral "105" to avoid cluttering in the Figures.

Further, it should be apparent that all the network devices in the Figures are configured for establishing corresponding ranks 410 (illustrated by a corresponding rank value): even though only the network devices "Root", "F" and "G" are illustrated as having an illustrated rank value with the reference numeral "410", it should be apparent that all the network devices in the Figures are allocated the same reference numeral "410" for their corresponding rank value to avoid cluttering in the Figures.

Any of the disclosed circuits of the devices 200 (including the device interface circuit 210, the processor circuit 220, the memory circuit 240, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 240) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 240 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 240 can be implemented dynamically by the processor circuit 220, for example based on memory address assignment and partitioning executed by the processor circuit 220.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a network device having established a connection with a parent network device in a directed acyclic graph (DAG) topology established according to a prescribed routing protocol in a communication network, that the network device has become an orphan based on detecting a loss of the connection with the parent network device;
   receiving, by the network device, a data packet from a child network device having attached to the network device according to the prescribed routing protocol; and forwarding, by the network device, a flagged copy of the data packet to one or more randomly-selected neighboring network devices, for attempted forwarding into the DAG topology, including setting in the flagged copy a loop detection flag that enables the network device to detect whether the flagged copy is returned to the network device.

2. The method of claim 1, further comprising the network device identifying the one or more neighboring network devices distinct from the prescribed routing protocol.

3. The method of claim 1, further comprising:
receiving a second data packet from the child network device;
determining the second data packet is the flagged copy comprising the loop detection flag; and
deleting the child network device from becoming a prospective parent for attempted recovery within the DAG topology.

4. The method of claim 3, further comprising:
determining the child network device having sent the flagged data packet to the network device is one of the one or more randomly-selected neighboring network devices in response to detecting a forwarding error flag in the flagged copy.

5. The method of claim 3, further comprising:
storing a pending target entry identifying the one or more neighboring network device having been forwarded the flagged data packet;
identifying the one neighboring network device having forwarded the flagged data packet to the child network device based on the corresponding pending target entry; and
deleting the one identified neighboring network device having forwarded the flagged data packet from becoming a prospective parent for the attempted recovery within the DAG topology.

6. The method of claim 1, wherein the forwarding further includes setting a rank field in the flagged copy to a worst-rank value higher than any other rank in the DAG topology.

7. One or more non-transitory tangible media encoded with logic for execution by a machine and when executed by the machine operable for:
detecting, by the machine implemented as a network device having established a connection with a parent network device in a directed acyclic graph (DAG) topology established according to a prescribed routing protocol in a communication network, that the network device has become an orphan based on detecting a loss of the connection with the parent network device;
receiving, by the network device, a data packet from a child network device having attached to the network device according to the prescribed routing protocol; and
forwarding, by the network device, a flagged copy of the data packet to one or more randomly-selected neighboring network devices, for attempted forwarding into the DAG topology, including setting in the flagged copy a loop detection flag that enables the network device to detect whether the flagged copy is returned to the network device.

8. The one or more non-transitory tangible media of claim 7, further operable for identifying the one or more neighboring network devices distinct from the prescribed routing protocol.

9. The one or more non-transitory tangible media of claim 7, further operable for:
receiving a second data packet from the child network device;
determining the second data packet is the flagged copy comprising the loop detection flag; and
deleting the child network device from becoming a prospective parent for attempted recovery within the DAG topology.

10. The one or more non-transitory tangible media of claim 9, further operable for:
determining the child network device having sent the flagged data packet to the network device is one of the one or more randomly-selected neighboring network devices in response to detecting a forwarding error flag in the flagged copy.

11. The one or more non-transitory tangible media of claim 9, further operable for:
storing a pending target entry identifying the one or more neighboring network device having been forwarded the flagged data packet;
identifying the one neighboring network device having forwarded the flagged data packet to the child network device based on the corresponding pending target entry; and
deleting the one identified neighboring network device having forwarded the flagged data packet from becoming a prospective parent for the attempted recovery within the DAG topology.

12. The one or more non-transitory tangible media of claim 7, wherein the forwarding further includes setting a rank field in the flagged copy to a worst-rank value higher than any other rank in the DAG topology.

* * * * *